United States Patent
Golia et al.

[11] Patent Number: 5,572,203
[45] Date of Patent: Nov. 5, 1996

[54] DEVICE FOR CONTROLLING THE POSITION OF AN IMAGE IN A HEAD-UP DISPLAY

[75] Inventors: Michel Golia, La Brede; Jean-Michel Francois, Talence, both of France

[73] Assignee: Sextant Avionique, Meudon La Foret, France

[21] Appl. No.: 480,734

[22] Filed: Jun. 7, 1995

Related U.S. Application Data

[63] Continuation of Ser. No. 160,846, Dec. 3, 1993, abandoned.

[30] Foreign Application Priority Data

Dec. 8, 1992 [FR] France ................... 92 14767

[51] Int. Cl.⁶ .......................................... G01C 21/00
[52] U.S. Cl. ........................ 340/980; 345/7; 359/630
[58] Field of Search .............................. 340/980, 461; 345/7, 8, 9; 359/630, 632; 348/115

[56] References Cited

U.S. PATENT DOCUMENTS

| | | |
|---|---|---|
| 3,885,096 | 5/1975 | Inuiya .......................... 345/7 |
| 4,439,755 | 3/1984 | Larussa . |
| 4,647,967 | 3/1987 | Kirschner et al. ................. 345/7 |
| 4,775,218 | 10/1988 | Wood et al. . |
| 4,847,603 | 7/1989 | Blanchard . |

FOREIGN PATENT DOCUMENTS 1932325  1/1970  Germany .

*Primary Examiner*—Brent A. Swarthout
*Attorney, Agent, or Firm*—Oblon, Spivak, McClelland, Maier & Neustadt, P.C.

[57] ABSTRACT

A device for controlling the position of a symbolic image generated on a combiner by a head-up display system. Two tests are performed alternately: a general position test, using a luminous spot generated on the image; and a combiner position test, using a light source, fixed to the structure of the image generator and using the same collimating unit as this generator. The signals generated by each of these light sources are received by the same position sensor whose output signals are processed by the same circuit that varies the image's X and Y positioning voltages. The circuit incorporates an amplifier equipped with a gain switch that allows the amplifying gain to be set according to which test is being performed at any given time.

4 Claims, 4 Drawing Sheets

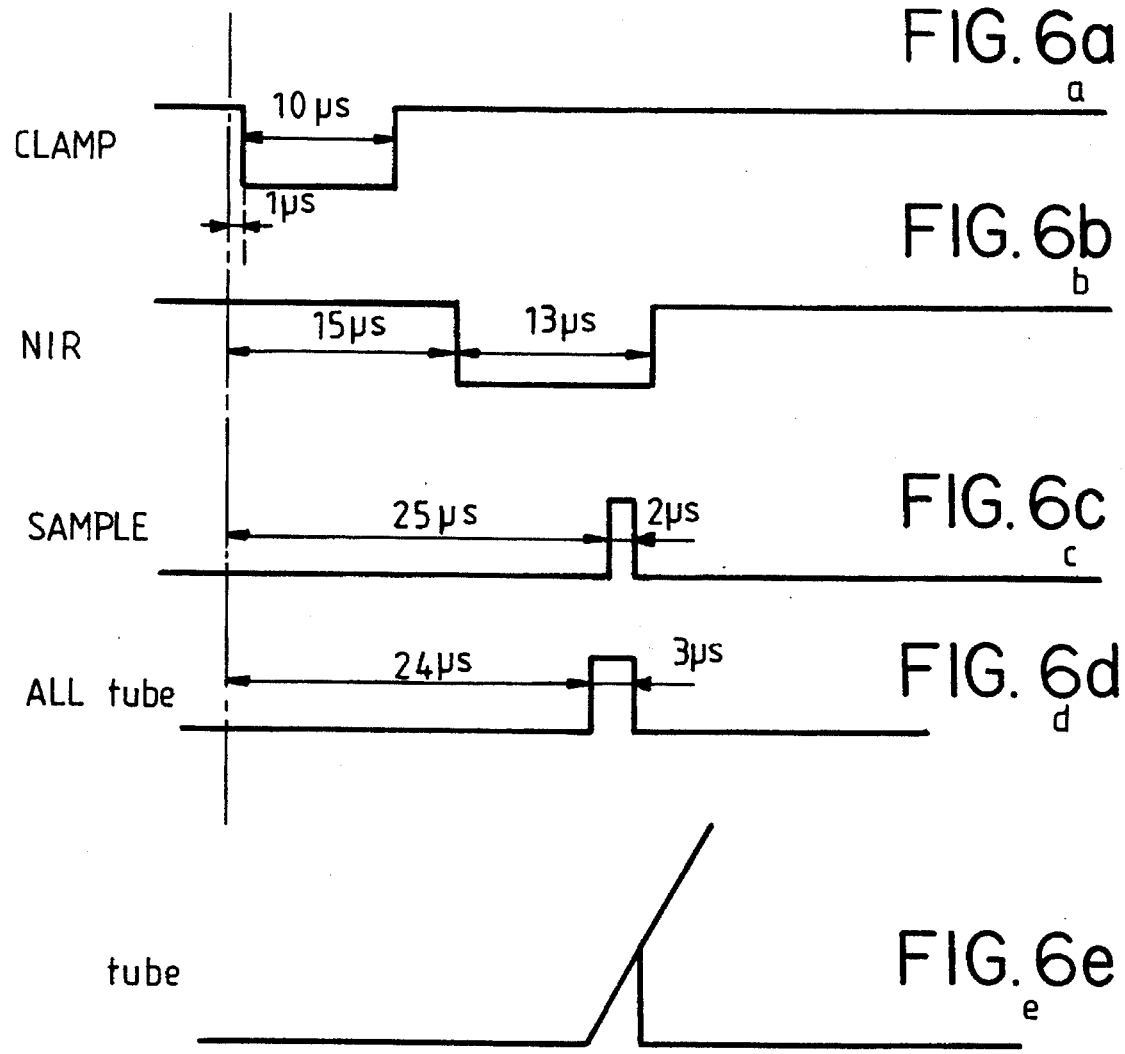

DEVICE FOR CONTROLLING THE POSITION OF AN IMAGE IN A HEAD-UP DISPLAY

This application is a continuation of application Ser. No. 08/160,846 filed on Dec. 3, 1993 now abandoned.

BACKGROUND OF THE INVENTION

1. Filed of the Invention

The present invention is concerned with head-up displays. Such displays allow an exterior view and a collimated symbolic image to be visualized simultaneously.

The invention can be applied whenever a symbolic image is to be positioned precisely with respect to the exterior view. This is the case whenever the symbolic image represents an element of the exterior view, for example, in an aircraft, when the symbolic element might be a landing strip or, in a military aircraft, when the symbol might represent a target.

2. Description of the Prior Art

Head-up displays of this kind, in general, incorporate a means of generating a symbolic image, an optical unit for projecting the image, and a combiner that consists of a partially transparent plate on which the projected image is received before being sent on towards the eye of an observer such as a pilot.

The problem of correctly positioning the symbolic image is well known in the prior art. It seems, however, that the need to reduce any positioning error to within a maximum value beyond which "flight by sight" in bad visibility would not be possible, has not been fully appreciated. Ways of detecting and correcting the errors due to bad positioning of the combiner have been described, for example, in patent U.S. Pat. No. 4,775,218.

In the device described in this patent, a light source, fixed to the structure of an aircraft, illuminates a mirror which is attached to a combiner and which reflects the light from the source towards a linear position sensor. This arrangement of sensor and light source can be used to detect a bad angular position of the combiner, measured about the axis about which the combiner can be turned up and down.

The signal generated by the sensor is processed by signal processing circuits and used to produce vertical movement of the image generated by a cathode ray tube, in order to compensate for the error in the position of the image due to bad positioning of the combiner.

The device described in the above mentioned patent has three drawbacks:

There is no correlation between the device and the means of projection; the device does not control the position of the combiner with respect to the image generation system.

The position is controlled along one axis only (line of site).

The absolute position of a symbol in the field of view, with respect to a reference point, is not guaranteed.

These three points are developed in the following paragraphs:

1) The device described in the patent is not intended as a device for controlling the position of the image, but as a device for controlling the relative position of the combiner with respect to a nominal position. The light source and the sensor are positioned with respect to the structure of the support and not with respect to the image generating device.

2) The device controls the position along a single axis only, and is intended only to compensate bad angular positioning of the combiner about an axis of rotation contained in or parallel to the plane of the combiner.

3) Good positioning of the combiner does not guarantee a good absolute position of the symbolic image since the positioning error of the combiner is only one of a number of sources of error.

SUMMARY OF THE INVENTION

The aim of the invention described below is to constantly control the position at which the symbolic image is overlaid onto the exterior view, and to guarantee the accuracy of this position.

This aim is achieved by identifying and compensating for all possible sources of error involved in positioning the symbolic image.

The rest of the description of the invention discusses the case of an image generator that incorporates a cathode ray tube. The invention is not limited to this example. It can be applied to any screen on which it is possible to generate, at least intermittently, and at least at one point, a luminous spot of sufficient brightness so that the light beam generated by this spot, after losses due to the optical components, is greater than a sensor's sensitivity threshold.

The principal sources of error can be divided into two distinct parts:

Electronic errors due to tube drift errors: deflection, very high voltage, offset and gain in X–Y circuits, all of which could cause a shift in the position of the image with respect to a nominal position.

Opto-mechanical errors due to bad angular positioning of the combiner with respect to the relay optics, which can be caused by mechanical wear that may occur, during normal use of the combiner.

The device according to the invention makes it possible to measure and compensate for both these types of error:

The global error, measured by testing the entire image positioning system.

The opto-mechanical error, measured by testing the angular position of the combiner.

The means used to test the entire image positioning system consist of, in the order in which the components occur along the optical path, a luminous spot at a given point on the image generating screen, a reflecting mirror fixed to the combiner, an optical unit that concentrates the beam reflected by the mirror, and finally, a sensor capable of detecting the position of the light beam as it emerges from the optical unit. These means also incorporate the electronic circuitry needed to process the signals output by the sensor.

The means used to test the angular position of the combiner consist of a light source, associated with a collimating optical unit, placed physically on the optical system used to generate the image. This first system illuminates the combiner through the optical unit used to project the screen image. The means used to perform this test also include an optical focusing system, capable of concentrating the light beam that emerges from the combiner onto a position sensor, and finally, the circuitry needed to process the signal output by the sensor.

To summarize, the invention concerns a device for verifying and correcting the position of a symbolic image, for use in head-up displays that incorporate a means of generating a symbolic image, and incorporating a structural part, an optical unit for collimating the symbolic image, and a combiner that receives the image from the collimating optical unit; the improvement being that the device for controlling the position of the image comprises:

a means of generating a luminous spot at a known position on a geometric surface on which the symbolic image is to be found, an optical focusing system, a first sensor capable of detecting position, incorporating a light sensitive surface that generates a signal that depends on the position of an incident light beam, a mirror fixed directly to the combiner or to a structural component attached in turn to the combiner, and a first means of processing the signals output by the sensor, the light beam emitted by the luminous spot being collimated by the symbolic image collimating unit and reflected by the mirror through the focusing system towards the first position sensor.

In one embodiment, the invention comprises, in addition, a light source fixed to the structure of the image generation system, an optical unit for collimating the light emitted by the source, a second position sensor incorporating a light sensitive surface that generates a signal that depends on the position of an incident light beam, a second means of processing the signals generated by this second sensor, and an optical focusing system, the collimating unit collimating the image of the light source onto the combiner, and the focusing system focusing the light reflected by the combiner onto the second sensor.

In the preferred embodiment of the invention, the optical system focuses the light from the luminous spot and that emitted by the light source onto the same, unique, position sensor. This sensor incorporates a light sensitive surface that is divided into several elements, each of which generates a signal that depends on the incident light beam. A switching system is used to control alternately the appearance of the luminous spot and the supply to the light source. The signals output by the switching system are fed-into the sensor output signal processing circuit, which is also unique. The switching signals are used to adapt signal processing, especially the gain of the amplifiers in the processing circuit. Specialists in this field should be familiar with how to build a circuit for processing the signals output by the position sensor, so only a brief description is given here:

It is known that the difference between the signals of two sectors of the sensor constitute a signal whose amplitude varies according to variations in the incident light they each receive. This difference is assessed for each pair of sectors by comparing the measured difference value to reference difference values which, in the case of the invention, correspond to a good position. These difference signals are amplified, processed, and used to control, in a predictable manner, the values of the voltages that determine the position of the symbolic image.

BRIEF DESCRIPTION OF THE DRAWINGS

The preferred embodiment of the invention will now be described with reference to the appended drawings of which:

FIG. 6 shows the different signal timing diagrams (a, b, c, d and e).

DESCRIPTION OF THE PREFERRED EMBODIMENT

Figure 1:
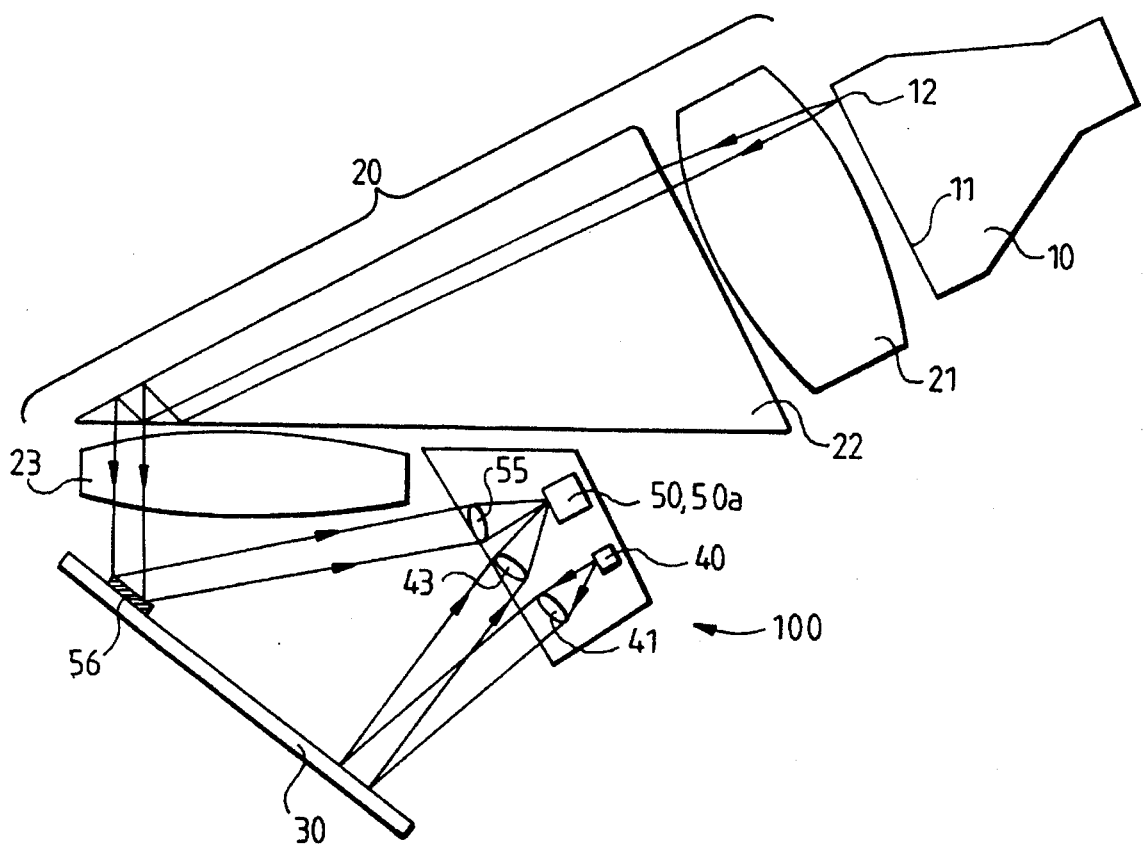
FIG. 1 is a general diagram designed to explain the optical aspects of the device according to the invention.

The diagram in FIG. 1 is designed to illustrate how the optical part of the device according to the invention works.

An image generating tube 10 incorporating a screen 11, projects an image onto a combiner 30 through an optical unit 20. The optical unit 20 represented in the diagram consists of two groups of lenses 21, 23 and one prism 22.

Components 10, 20 and 30 are known in the prior art. They are not part of the present invention.

A source of light 40 consisting of an infrared diode emits a beam of light which is collimated by lens $L_1$ 41 and reflected onto the combiner 30.

The reflected light is focused by lens $L_2$ 43 onto a four quadrant sensor 50. The diode is switched on intermittently. During the periods when the diode is switched off, the sensor 50 receives light from a luminous spot 12 on the screen 11. This spot, also, is present on the screen only intermittently. The light beam emitted by the luminous spot is collimated by the optical unit 20 onto a mirror 56 which is fixed to the structure of the combiner, being, for example, mounted on a frame upright. After being reflected by the mirror 56, the light beam is focused by lens $L_3$ and reaches the sensor 50. In the preferred embodiment described here, there is only one sensor and, as will be seen later, only one signal processing circuit 60.

Clearly, it would also be possible to build the device using two sensors 50 and 50a, and to process the signals generated by each sensor in separate dedicated circuits (60 and 60a). This configuration has not been represented.

The arrows in FIG. 1 show the paths taken by the rays of light emitted by the luminous spot 12 and by the diode 40.

Figure 2:
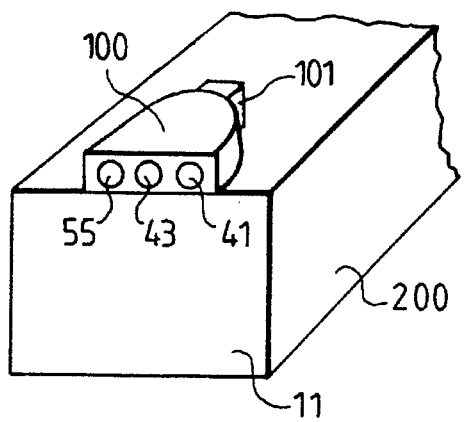
FIG. 2 shows the physical structure of the device according to the invention.

In the preferred embodiment of the invention, the diode, the lenses, and the sensor are grouped together in a sensor module 100 mounted on a supporting structure 200 as shown in FIG. 2. This structure also supports the tube 10 and the optical unit 20. The advantage of this configuration is that, from a functional point of view, it allows the position of the symbolic image itself to be controlled, and not, as in the prior art, the position of one of the components of the means used to generate the image. This configuration also makes it possible for existing head-up displays to be modified easily, by the addition of a single module containing the optical system and the circuits needed to process the signals generated by the four quadrant sensor. This sensor will be discussed later. The sensor module can be connected, via a connector 101 located behind the module and using cables that are not shown in the diagram, to the electric circuits of the head-up display and, in particular, to the circuits used to control the lateral and vertical movement of the image generated on the screen 11.

Before describing how the device works, the precautions to be taken and the types of components to be used will be discussed:

The four quadrant sensor selected for the application has a square zone of sensitivity (3 by 3 mm), divided into four square sections. The sensor used in the preferred embodiment is a HAMAMATSU S4349 sensor.

Figure 3:
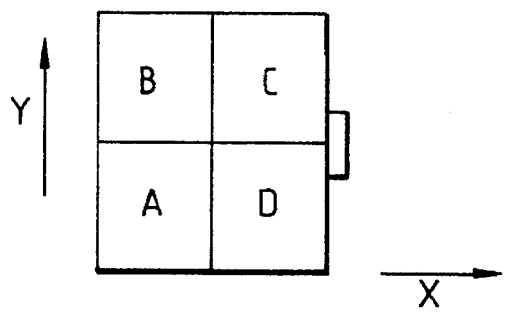
FIG. 3 illustrates how the sensor is divided into quadrants.

FIG. 3 shows the rear view of the sensor's light sensitive surface.

For the four quadrants, A, B, C and D, receiving a given incident ray, the signals of the X and Y positions of a luminous spot are given by:

$$X = \frac{(C+D)-(A+B)}{(A+B+C+D)}$$

$$Y = \frac{(B+C)-(A+D)}{(A+B+C+D)}$$

These values correspond directly to the algebraic difference between the position of the spot and a reference point, taken to be situated at the center of the sensor.

In the chosen example of the embodiment, the spot has a diameter of 2 mm. Therefore, in order for the entire spot to remain on the sensor, the maximum angular error must correspond to a maximum shift of 0.5 mm on the sensor.

Hence, the positions and characteristics of lenses $L_1$, $L_2$ and $L_3$ should be calculated after the maximum angular positioning error has been evaluated. This maximum angular error should generate a movement of no more than 0.5 mm in the position of the luminous spot incident on the sensor.

Similarly, the intensity of the light beam incident on the sensor should be verified to ensure that it lies within the range compatible with the sensor's recommended operating conditions. This intensity is equal to the amount of light emitted by the diode and available in the solid angle effectively used, reduced by the various coefficients of transmission through the optical system.

Those skilled in the art are already familiar with these calculations which will therefore not be covered here.

The diode used in the preferred embodiment is a Siemens SFH 428-1 diode.

In order to ensure that the sensor operates at constant power, and to avoid the effects of temperature drift, a negative feedback circuit is used to control the diode supply with reference to a nominal voltage, so that any variation in power at the sensor is compensated for by the feedback circuit.

As for the luminous spot, it is positioned on the tube by the X–Y circuits incorporated in the image generation system 10. The light from this source passes through the optical unit 20 and is reflected by the mirror 56, positioned on the support of the combiner 30, onto the four quadrant sensor 50. The luminous spot is positioned sufficiently far outside the immediate field of vision so as not to be seen by the pilot. All changes in position detected by the sensor represent the sum of all contributing error factors and, according to the results of the combiner position test, a correction can be applied to the gain.

Figure 4:
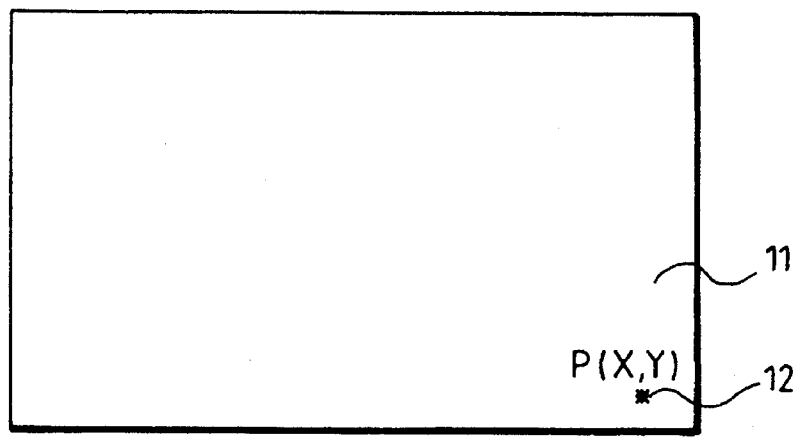
FIG. 4 shows the position of the luminous spot in one corner of the screen.

In order for the luminous spot 12 to lie outside the pilot's immediate field of vision, it should be positioned close to the edge of the screen 11, as shown in FIG. 4.

Several precautions should be taken when generating a luminous point on a cathode ray tube, in order to avoid marking the tube permanently.

It is considered that a tube's luminous yield is reduced by half once it has received a given charge. This charge is either specified by the manufacturer, or it can be measured.

Given the tube's specified lifetime, the average maximum allowed current can be calculated. According to the brilliance required during measurement, the maximum test frequency and the duration of illumination of the spot 12 can be deduced.

The diameters and focal lengths of lenses 41, 43 and 55 should be chosen according to the variations in position of their incident light beams, taking into account the maximum errors.

As for lenses 43 and 55, which focus the beams on the sensor 50, attention is drawn to the fact that the sensor is not placed exactly at the focal point of these lenses. As has already been seen, the sensor must receive an incident luminous spot of a given size. The defocalizing distance, measured between the focal point and the plane of the sensor must therefore be evaluated.

The circuits used to process the signals generated by the sensor 50, and the way in which they work are described in the following paragraphs, with reference to FIG. 5.

Figure 5:
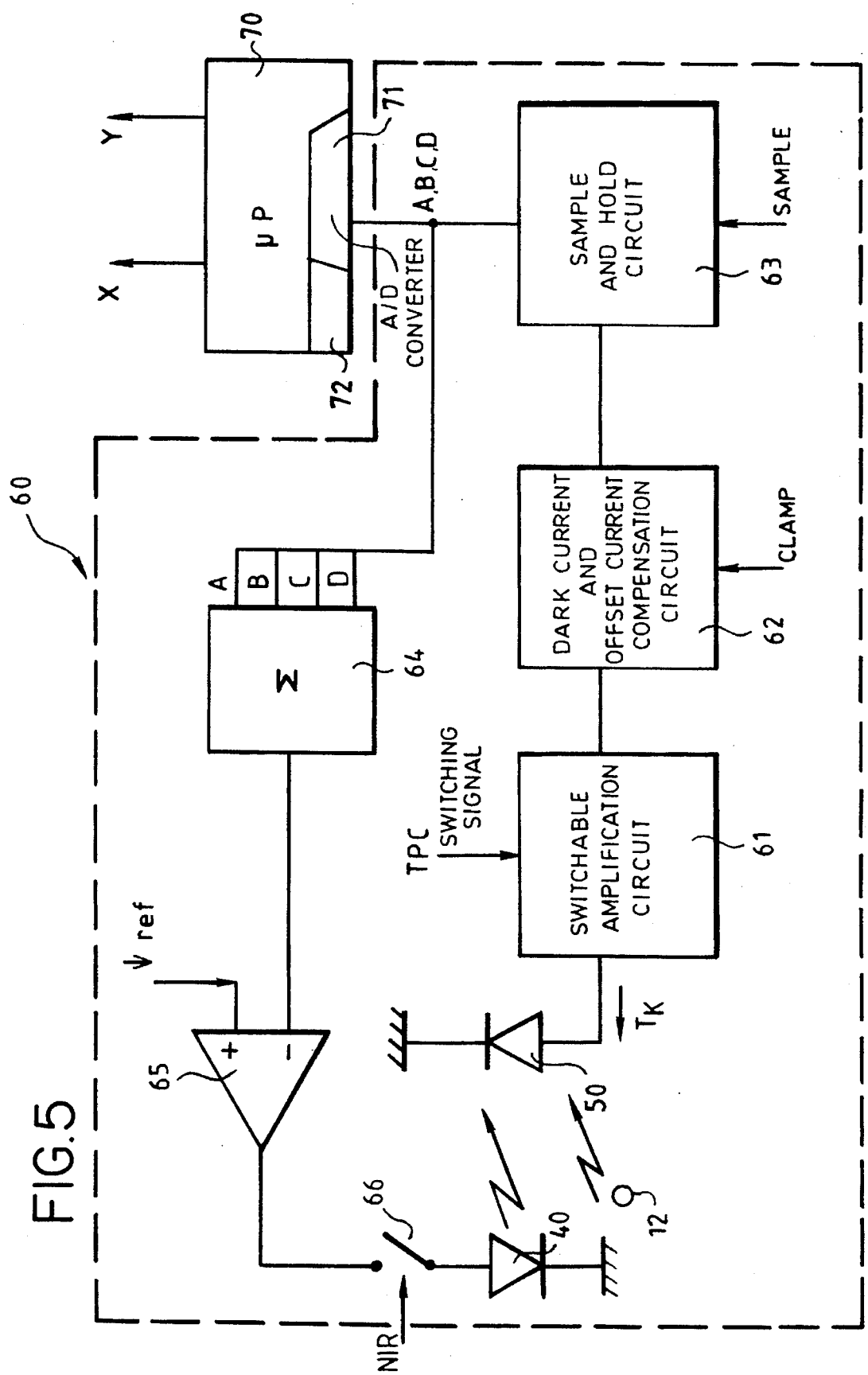
FIG. 5 is the signal processing electronic circuit diagram.

In FIG. 5, sensor 50 is represented by diode 50, since it is the sensor current that is of interest. It should be understood that there is really one source of current for each quadrant and that therefore there are four identical circuits, containing respectively components 50A, 50B, 50C and 50D corresponding to each of the four quadrants, and each containing elements 61, 62, 63 and 71 whose functions will be described later.

The signal generated by the sensor 50, which receives incident light, via the optical system described earlier, alternatively from the luminous spot 12 and the diode 40, is input into a low-noise, high-gain current pre-amplifier, then into a second amplifier which produces an output signal of about 30 mV.

These two components are shown in FIG. 5 as a single amplifying functional unit 61. The gain generated by this amplifying unit is switched upon reception of a switching signal, TPC, represented by an arrow. The switching signal is generated by a sequencer 72 included in a microprocessor 70. This control circuit is not shown in the diagram. The sequencer 72 itself is synchronized with the image generation circuits of unit 10. The switch in gain is necessary because the intensity of the light beam to be measured is much less (by a factor of about 10,000) for the global position test where the light source is the luminous spot 12, than for the combiner position test where the light source is the diode 40. In spite of this difference, the controlled change in gain ensures that the same voltage levels are obtained from the amplifier output. Consequently, the same signal processing circuit 60 can be used for both tests.

The output signal from the amplifier 61 is reduced by a dark current and offset current compensating circuit 62. Dark current is the current generated by ambient light in the absence of a light beam generated by sources 12 and 40. Every time one of the light sources 12 or 40 is switched on, the value of the dark current and offset current of the amplifier 61, measured before the source is switched on, is recorded across a low-loss capacitor (<70 mV/μs). This value is subtracted from the output value of the amplifying unit 61.

The dark current can be ignored in the case of the combiner position test where the relative value of this current is very small (<<0.0001). It cannot, however, be ignored in the case of the global system test where the working current is very close to that of the dark current.

The value of the useful current collected at the output of the compensating circuit 62 is measured and recorded in a sample and hold circuit 63. Sampling occurs in a single step upon reception of the "sample" signal from the sequencer 72. Sampling is synchronous for all four sample and hold circuits 63 and is of short duration (2 μs). In this way, the errors due to parasitic ambient light can be ignored.

The signals output by the sample and hold circuits 63 undergo analog to digital conversion by four analog/digital converters 71 before being fed into the processing microprocessor 70. From the values of the input signals, this microprocessor calculates the variations in voltage, for both the lateral and vertical shift of the symbolic image, to be applied to the existing voltages in order to return the image to its centered position. The signals output by the sample and hold circuit 63 are also input to a summation circuit 64, which adds together signals A, B, C and D. The resulting signal, fed to a differential amplifier 65 is used to regulate the supply to the diode 40.

The timing of the measurement signals will now be discussed, with reference to FIG. 6. In the preferred embodiment of the invention, the test device takes the form of a unit 100 designed, for the sake of simplicity, to use the synchronization signals generated by the image generator 10.

It should nevertheless be understood that the two tests are performed one after the other, for a duration that is specific to each test, and with identical timing, at the image refresh frequency of 50 times per second.

The general positioning test could be performed, for example, during the seconds that immediately follow each new positioning of the combiner and/or triggered on demand, since the drifts introduced by the tube are slow. The combiner position test could then be performed during the rest of the time, i.e. practically constantly.

FIG. 6 shows 5 signal diagrams, labeled a, b, c, d and e.

The vertical axis of each signal diagram represents the value of the signal; the horizontal axis represents time.

Signal diagrams a, b and c represent the signals used for the combiner position test. Signal diagrams a, d, e and c represent the signals used for the general image position test.

Signal diagram a shows that, after a synchronization impulse of 1 μs, the accumulated charge on each of the four quadrants A, B, C and I) of the sensor 50 is measured over a period of 10 μs.

This measurement is made when no other signal is present and is used to build a signal, called the "clamp" signal, which represents the offsets of the amplifier and the sum of the dark currents.

The value of each of these four signals is recorded in circuit 62 as explained above.

Signal diagram b represents the signal used to turn on diode 40. The length of the signal corresponds to the time that contact 66 (FIG. 5) remains closed, and is equal to 13 μs, starting 15 μs after the initial synchronizing impulse.

The sampling signal input to the sampling circuit 63, as shown in signal diagram c, starts 25 μs after the initial impulse and lasts, as indicated above, 2 μs.

The general position test is performed less frequently and instead of a combiner position test cycle. The dark current (signal diagram a) is measured, with lighting of the luminous spot being triggered 24 μs after the synchronizing impulse and lasting for 3 μs, as shown in signal diagram d. Lighting the luminous spot causes a progressive increase in brilliance, as represented by diagram e. Supposing that the tube has a time constant of 3 ms before the peak power of 150 mega-candelas per $m^2$ is reached, then the brilliance after 2 μs is approximately 100 kilo-candelas. The increase in brilliance is represented in diagram e. Sampling occurs 25 μs after the initial impulse and lasts 2 μs as before (signal diagram c).

Obviously, numerous modifications and variations of the present invention are possible in light of the above teachings. It is therefore to be understood that within the scope of the appended claims, the invention may be practiced otherwise than as specifically described herein.

What is claimed is:

1. A device for verifying and correcting the position of a symbolic image, for use in head-up display systems which incorporate means for generating a symbolic image, said device comprising:

means for generating a luminous spot at a known position on a geometric surface on which said symbolic image is formed, said luminous spot emitting a light beam;

a first collimating optical unit for collimating said symbolic image onto a combiner and said light beam onto a mirror fixed to a structure of said combiner;

a first optical focusing system for focusing said light beam which is reflected from said mirror;

a first position sensor having a light sensitive surface which receives said light beam focused by said first optical focusing system and generates a signal in accordance with a position of said light beam;

first means for processing signals output from said first position sensor to thereby correct a position of said symbolic image;

a second position sensor having a light-sensitive surface divided into a number of elements each of which emits a signal which varies in accordance with variations of an incident light beam; and second means for processing signals output by said second position sensor to thereby correct a position of said symbolic image, wherein said second collimating optical unit collimates an image of said light source onto said combiner, and said second optical focusing system focuses light emitted by said light source and reflected by said combiner onto said second position sensor.

2. A device for verifying and correcting the position of a symbolic image, for use in head-up display systems which incorporate means for generating a symbolic image, said device comprising:

means for generating a luminous spot at a known position on a geometric surface on which said symbolic image is formed, said luminous spot emitting a light beam;

a fist collimating optical unit for collimating said symbolic image onto a combiner and said light beam onto a mirror fixed to a structure of said combiner;

a first optical focusing system for focusing said light beam which is reflected from said mirror;

a first position sensor having a light sensitive surface which receives said light beam focused by said first optical focusing system and generates a signal in accordance with a position of said light beam; and first means for processing signals output from said first position sensor to thereby correct a position of said symbolic image;

a light source fixed to a structure of said means for generating a symbolic image;

a second collimating optical unit for collimating light emitted by said light source;

a collimating system which collimates an image of said light source onto said combiner; and a second optical focussing system which focuses light reflected by said combiner onto said first position sensor, wherein said means for generating a luminous spot comprises a system which sequentially switches between generating said luminous spot and supplying said light source, and which sends switching signals to said first means for processing signals output from said first position sensor.

3. A device according to claim 2, wherein said first means for processing signals from said first position sensor comprises an amplifying unit whose gain is switchable in sequence with said switching signals for supply of said light source or said luminous spot.

4. A device for verifying and correcting the position of a symbolic image, for use in head-up display systems which incorporate means for generating a symbolic image, a collimating optical unit for collimating said symbolic image, and a combiner that receives said symbolic image from said collimating optical unit, said device comprising:

first means for controlling a position of a given point on said symbolic image;

second means for controlling a position of said combiner, said second means and said first means operating alternately using a single position sensor which produces signals; and circuit means for processing signals received from said position sensor, said circuit means including an amplifier whose gain is switchable between values compatible with said first means and said second means;

wherein said circuit means for processing signals received from said position sensor comprises a circuit which records signals produced by said position sensor before running either a first test which measures an error in an image position of an image displayed by said head-up display system or a second test which measures an angular position of said combiner.

* * * * *